United States Patent
Hobmeyr

(10) Patent No.: US 9,752,697 B2
(45) Date of Patent: Sep. 5, 2017

(54) VALVE UNIT AND MOTOR VEHICLE

(71) Applicant: GM GLOBAL TECHNOLOGY OPERATIONS LLC, Detroit, MI (US)

(72) Inventor: Ralph Hobmeyr, Mainz-Kastel (DE)

(73) Assignee: GM Global Technology Operations LLC, Detroit, MI (US)

( * ) Notice: Subject to any disclaimer, the term of this patent is extended or adjusted under 35 U.S.C. 154(b) by 147 days.

(21) Appl. No.: 14/540,788

(22) Filed: Nov. 13, 2014

(65) Prior Publication Data

US 2015/0219234 A1    Aug. 6, 2015

(30) Foreign Application Priority Data

Jan. 31, 2014   (DE) .................. 10 2014 001 306

(51) Int. Cl.

| F16K 27/02 | (2006.01) |
|---|---|
| F16K 15/18 | (2006.01) |
| F16K 15/04 | (2006.01) |
| F16K 15/06 | (2006.01) |

(52) U.S. Cl.
    CPC ........ *F16K 27/0245* (2013.01); *F16K 15/044* (2013.01); *F16K 15/063* (2013.01); *F16K 15/183* (2013.01); *F16K 27/0209* (2013.01); *F16K 27/0254* (2013.01)

(58) Field of Classification Search
    CPC ........... F17K 27/0245; Y10T 137/7922; Y10T 137/7904; Y10T 137/7839; Y10T 137/7924; Y10T 137/7929
    USPC ...................... 137/535, 528, 512.1, 537, 540
    See application file for complete search history.

(56) References Cited

U.S. PATENT DOCUMENTS

| 788,986 | A | * | 5/1905 | Zins | ...................... E21B 43/121 |
|---|---|---|---|---|---|
| | | | | | 137/535 |
| 1,097,095 | A | * | 5/1914 | Henry | ..................... F16K 17/00 |
| | | | | | 137/459 |
| 1,807,594 | A | * | 6/1931 | Hopkins | ................. F16K 1/385 |
| | | | | | 137/535 |
| 2,170,478 | A | * | 8/1939 | Long | ...................... F16L 29/00 |
| | | | | | 137/514.3 |
| 2,189,129 | A | * | 2/1940 | Bridwell | ................... F16K 1/40 |
| | | | | | 137/512.1 |

(Continued)

FOREIGN PATENT DOCUMENTS

| DE | 6810915 U | 4/1969 |
|---|---|---|
| DE | 37 03 114 A1 | 8/1988 |

(Continued)

*Primary Examiner* — Craig Schneider
*Assistant Examiner* — Nicole Gardner
(74) *Attorney, Agent, or Firm* — John A. Miller; Miller IP Group, PLC

(57) ABSTRACT

A valve unit for a motor vehicle having a valve housing, which includes a valve inlet and a valve outlet, and having a valve body disposed in the valve housing, which includes a cross-section, increasing up to an inflection point and decreasing once past the inflection point, and which is guided from a closed position in which the valve body seals the valve inlet to a final opened position in which the valve body abuts a stop element fixed in the valve housing, releasing the valve inlet, and in which an inflow section is formed between the valve inlet and the inflection point of the valve body, and an outflow section is formed between the inflection point of the valve body and the valve outlet.

19 Claims, 2 Drawing Sheets

(56) References Cited

U.S. PATENT DOCUMENTS

| | | | | |
|---|---|---|---|---|
| 2,673,062 A | * | 3/1954 | Cornelius | F16K 15/026 137/540 |
| 2,675,021 A | * | 4/1954 | Allin | F16K 15/063 137/516.29 |
| 2,809,660 A | * | 10/1957 | Becker | F16K 15/026 137/514.3 |
| 2,930,401 A | * | 3/1960 | Cowan | F16K 15/025 137/540 |
| 3,099,999 A | * | 8/1963 | Vismara | F16K 15/026 137/515.5 |
| 3,160,112 A | * | 12/1964 | Flaton | F04D 15/0083 137/543.15 |
| 3,458,054 A | * | 7/1969 | Thompson | F16F 9/34 137/512.1 |
| 3,580,275 A | * | 5/1971 | Hanson | F16K 15/026 137/516.29 |
| 3,586,047 A | * | 6/1971 | Ehrenberg | F16L 37/23 137/540 |
| 3,770,009 A | * | 11/1973 | Miller | F16K 15/026 137/515.5 |
| 3,776,278 A | | 12/1973 | Allen | |
| 4,091,838 A | * | 5/1978 | Dowty | E21D 15/512 137/514.5 |
| 4,121,619 A | * | 10/1978 | Pauliukonis | F16K 1/385 137/469 |
| 4,213,021 A | * | 7/1980 | Alexander | F16K 37/0033 137/540 |
| 4,582,081 A | * | 4/1986 | Fillman | F16K 15/145 137/218 |
| 4,911,196 A | * | 3/1990 | Kemp | F16K 15/026 137/220 |
| 5,375,621 A | * | 12/1994 | Gaehwiler | F16K 15/148 137/220 |
| 5,921,276 A | * | 7/1999 | Lam | F16K 15/026 137/220 |
| 6,899,127 B1 | | 5/2005 | Swingley | |
| 7,290,562 B2 | * | 11/2007 | Kane | F16K 15/026 137/538 |
| 8,069,876 B2 | * | 12/2011 | Kane | F16K 15/026 137/538 |
| 8,365,753 B2 | * | 2/2013 | Dana | F16K 31/084 137/12 |
| 9,163,738 B1 | * | 10/2015 | LaCroix | F16B 17/044 |
| 2001/0039966 A1 | * | 11/2001 | Walpole | F04B 39/1053 137/512.1 |
| 2008/0202478 A1 | | 8/2008 | Möhring et al. | |
| 2009/0250123 A1 | * | 10/2009 | Matsubara | F16K 15/063 137/528 |
| 2013/0228241 A1 | * | 9/2013 | Gass | E03B 7/078 137/512 |
| 2013/0312852 A1 | * | 11/2013 | Dickenscheid | F02M 59/462 137/535 |
| 2014/0096848 A1 | * | 4/2014 | Weng | F04B 33/005 137/535 |
| 2015/0034179 A1 | * | 2/2015 | Loga | F16K 31/1245 137/492 |
| 2015/0034195 A1 | * | 2/2015 | Shima | F16K 27/02 137/843 |
| 2015/0219234 A1 | * | 8/2015 | Hobmeyr | F16K 15/183 251/337 |
| 2015/0322743 A1 | * | 11/2015 | Thompson | E21B 33/038 166/75.11 |
| 2016/0102771 A1 | * | 4/2016 | Kuroyanagi | F17C 13/04 137/540 |

FOREIGN PATENT DOCUMENTS

| | | |
|---|---|---|
| DE | 38 15 350 A1 | 11/1989 |
| DE | 43 40 783 A1 | 6/1994 |
| DE | 10 2010 062 658 A1 | 6/2012 |
| EP | 1 319 884 A2 | 6/2003 |

* cited by examiner

VALVE UNIT AND MOTOR VEHICLE

The invention relates to a value unit, in particular a CNG (compressed natural gas) valve for a motor vehicle, and to a motor vehicle having such a valve unit.

A valve unit, in particular CNG (compressed natural gas) valves are adapted for transmitting gaseous and/or liquid fluids preloaded under pressure. They are used to stop a return flow of the gas in order to prevent the gas from exiting through the inlet.

The virtuality of securely and automatically stopping any backflow, necessitates a strong restoring force. This force counteracts a flow in the filling direction. The stronger and more securely the valve is intended to close, the greater the restoring force that must be selected, which disrupts the flow in the filling direction.

A valve unit is known from EP 1 319 884 A2.

It has proven disadvantageous, that in known valve units, given high filling pressures and/or filling rates, the static pressure within the valve housing is higher at the outlet side than at the inlet side, as a result of which a valve body of the valve unit is loaded from a final opened position in a closed position. When the valve body moves from the final opened position into the closed position, the resulting force vector alters its direction in the direction of the final opened position, as a result of which the valve body is moved backwards. The process is repeated multiple times, as a result of which the valve body oscillates during the filling operation, leading to excessive wear and a reduction in the service life of the valve unit. At the same time, the oscillation is perceived by a user as an unpleasantly experienced noise.

An object of one embodiment of the invention is to propose a valve unit, in which a noise development, at least during filling at high filling pressures or filling rates, is reduced and the service life of the valve unit is increased.

This object is achieved according to a first aspect of the invention by a valve unit, in particular a CNG (compressed natural gas) valve, for a motor vehicle, having at least one valve housing, which includes a valve inlet and a valve outlet, and having at least one valve body disposed in the valve housing, which—as viewed from the valve inlet in the direction of the valve outlet—includes a cross-section which increases up to an inflection point and decreases once past the inflection point, and which may be guided from a closed position, in which the valve body seals the valve inlet, to a final opened position, in which the valve body abuts a stop element fixed in the valve housing, releasing the valve inlet, and in which an inflow section is formed between valve inlet and inflection point of the valve body, and an outflow section is formed between inflection point of the valve body and valve outlet, the smallest cross-section of which—as viewed transversely to the flow direction—is smaller—as viewed transversely to the flow direction—than the smallest cross-section of the inflow section.

An inflection point may be understood to be a virtually punctiform point of the outer contour of the valve body, the cross-section of the valve body increasing or decreasing until it reaches this point and after which it is passed, the cross-section of the valve body immediately decreases or increases.

An inflection point may also be understood to be an area of the outer contour of the valve body, the cross-section of the valve body increasing or decreasing until it reaches this point, at which the cross-section of the valve body remains constant, and after which it is passed, the cross-section of the valve body immediately decreases or increases.

Because the inflow section between the inflection point and the valve inlet always includes a larger cross-section than the outlet section between inflection point and valve outlet, the area through which the fluid is to flow is always larger in the area of the inlet section.

As a result of this, the flow rate of the fluid on the side of the inlet section is less than the flow rate of the fluid on the side of the outlet section. The physical effect of this is that the dynamic pressure in the area of the outlet section is always greater than the dynamic pressure in the area of the inlet section. Given the overall prevailing constant total pressure, it follows, conversely, that the static pressure in the area of the inlet section is greater than the static pressure in the area of the outlet section. This prevents the valve body from being forced back into the closed position.

At the same time, the valve body is more securely fixed in the final opened position as a result, thereby preventing an oscillating movement. Thus, fixing the valve body in the final opened position reduces the noise development and increases the service life of the valve unit.

In principle, it is conceivable that, the consistently larger cross-sectional area of the inlet section in relation to the cross-sectional area of the outlet section is achieved due to geometric shape of the valve body. However, it is possible to more simply and cost-effectively turn to existing valve bodies, if the inlet section includes an expanding cross-section in the area of the valve inlet, which expands in the direction of the valve outlet to a maximum cross-section and, after passing the maximum cross-section, narrows continuously and, transitions, in particular, seamlessly, into the outlet section.

This valve body is simple and cost-effective to manufacture, if the inflow section and/or the outflow section includes a truncated cone-like cross-section, at least in the area of the valve body.

In principle, it is conceivable for the valve body to be fixed by the valve housing in the final opened position as a result of the shape of the valve housing. However, it has proven advantageous if the value unit includes at least one stop element, which may be disposed or is disposed in the outflow section and which is indirectly or directly abutted by the valve body in the final opened position.

In addition to the aforementioned exemplary embodiment, the valve unit may include a guide means, which is fixable to or is fixed to the valve body and/or to the stop element, and which is supported in the final opened position of the valve body against the stop element.

To ensure a through-flow or flow past the valve body at the stop element, it has proven advantageous if the stop element and/or the guide means includes at least one recess extended in the flow direction and/or if the valve body includes at least one notch which at least in the final opened position opens into the recess of the stop element and/or the guide means, in order to establish a fluid passage from inflow section to outflow section in the final opened position.

In such case, a through-flow or flow past the valve body is ensured, in particular, if the guide means is fixed to the valve body.

In order to automatically guide the valve body from the final opened position back to the closed position following the filling process, it has proven advantageous if the valve unit includes at least one return means, with which the valve body may be tensioned in the closed position.

In principle, the return means may be arbitrarily designed. It may, for example, be mechanically, electromagnetically, magnetically or pneumatically attachable. The return means may be easily and cost-effectively manufactured if the return means comprises a return spring, which is disposable or is disposed, at least in sections, in the recess of the guide means, and which is supported on the one hand against the stop element and on the other hand against the valve body or the valve housing.

The return means, because it is disposable in the recess of the guide means, may be guided when being compressed and expanded again.

The valve housing, in particular the inflow section and the outflow section, may include any desired contour. This also applies similarly to the stop element and the valve body. The valve body may include an n-angled body, for example, which may be guided, for example, with rib-like elevations in groove-like indentations of the housing, in order to guide a movement from the closed position to the final opened position. To achieve a uniform pressure distribution across the respective cross-sections, as seen in the flow direction, it is advantageous if the valve housing, in particular, the inflow section and the outflow section, the stop element and/or the valve body have a rotationally symmetrical design.

To reduce a passage of fluid in the closed position of the valve body, at least one sealing element is provided in one embodiment of the valve unit, which abuts the valve body and the valve inlet in the closed position of the valve body.

The sealing element may, in principle, be arbitrarily disposed. In one embodiment, it has proven advantageous if the sealing element is fixable in or is fixed in the valve housing, in particular, between the valve inlet and the inflow section.

The valve body in such case is simple and cost-effective to manufacture.

Alternatively or in addition, it is also conceivable, however, that the sealing element is fixable to or is fixed to the valve body. In such case, the sealing element may be detachably or non-detachably fixed to the valve body.

In order to detachably fix the sealing element to the valve body, it has proven advantageous if the valve body includes at least one head part and one base part, which may be detachably fixed to one another, and between which, in particular, the sealing element, is fixable or is fixed by joining head part and base part, in particular, forming a tongue and groove. Moreover, in the case of a valve body with a multi-part design, this facilitates the installation of the valve body in the valve housing.

Additionally, the valve body may be arbitrarily shaped. In such case, it has proven advantageous if the valve body, in particular, the head part and/or the base part has an arcuate or n-angular section, and/or if the valve body includes a ball or an arrow-shaped body.

The object has been achieved by a motor vehicle having such a valve unit, in particular, having at least one of the aforementioned features.

The valve unit and the motor vehicle having such a valve unit have proven to be advantageous in several respects.

Because the smallest cross-section of the inflow section is larger than the smallest cross-section of the outflow section, it is ensured that the static pressure in the inflow section is always greater than the static pressure in the outflow section, as a result of which the valve body is held even more securely in the final opened position.

Because the inflow section and the outflow section have a truncated cone-like design, it is simple and cost-effective to implement the adjustment of the static pressure in the inflow section, which is higher relative to the outflow section.

Additional features, details and advantages are derived from the appended patent claims, from the drawing figures and from the following description of a preferred embodiment of a valve unit.

Figure 1:
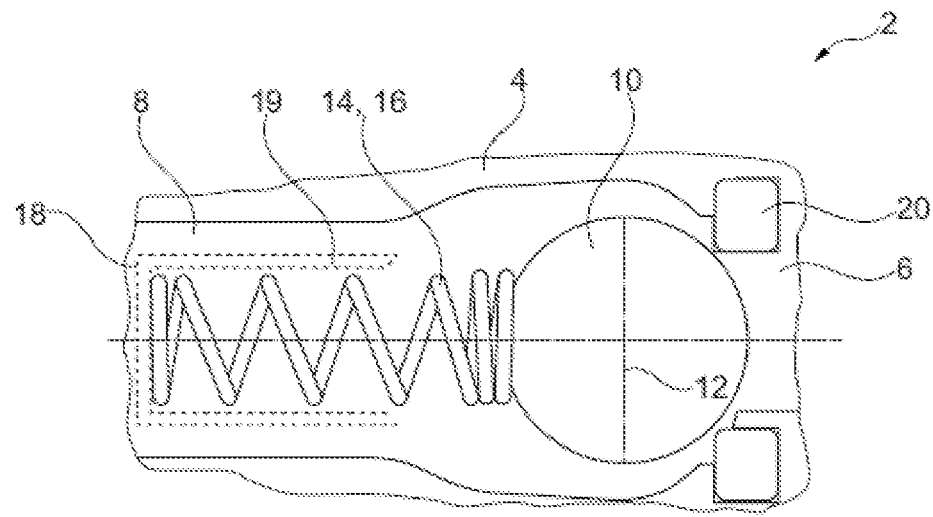
FIG. 1 shows a sectional side view of a first exemplary embodiment of the valve unit with a valve body in the closed position.

Each of the figures shows a valve unit for a motor vehicle, identified in its entirety by reference numeral 2. The valve unit includes a valve housing 4, which is accessible from the outside via a valve inlet 6 and a valve outlet 8. Disposed in the valve housing 4 is a valve body 10, which may be guided from a closed position (FIGS. 1 and 3) to a final opened position (FIGS. 2 and 4). The valve body 10 includes a cross-section which increases up to an inflection point 12 and which decreases once past the inflection point 12. The valve body 10 is pre-tensioned into the closed position by a return means 16 designed as a return spring 14.

Additionally, the valve unit 2 includes a stop element 18 and a guide means 19, against which the valve body 10 is supported in the final opened position (FIGS. 2 and 4).

Figure 2:
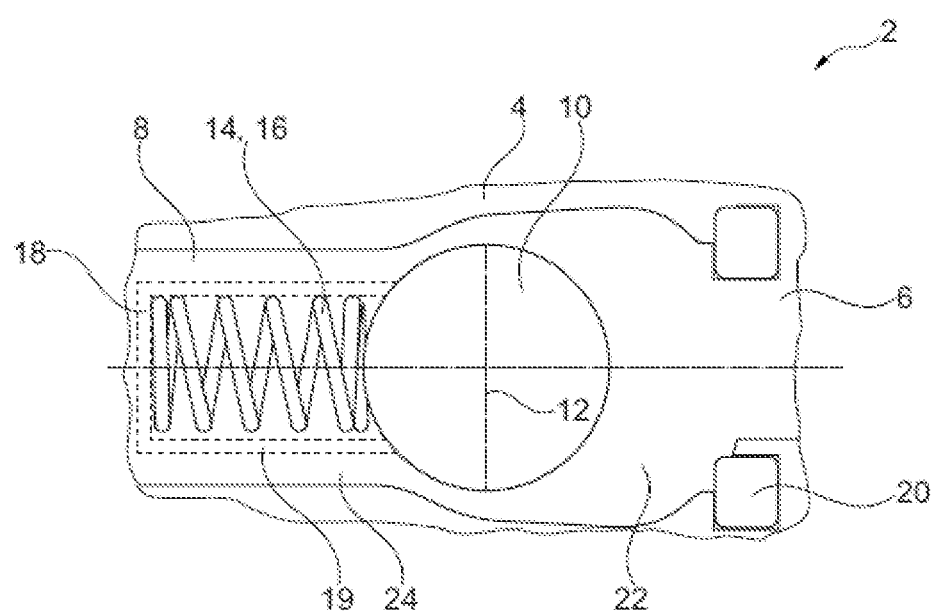
FIG. 2 shows a sectional side view of the first exemplary embodiment according to FIG. 1 with the valve body in a final opened position.

FIG. 1 shows the valve unit 2 in the closed position. In this position, the valve body 10 abuts the valve inlet 6 of the valve housing 4. Disposed between valve body 10 and valve inlet 6 is a sealing element 20, by means of which penetration and or return flow of fluid is prevented. The valve body 10 includes a ball. The guide means 19 and the stop element 18 comprise a single component.

FIG. 2 shows the exemplary embodiment according to FIG. 1, in which the valve body 10 is disposed in a final opened position. In this position, the return means 16 designed as return spring 14 is compressed and the valve body 10 abuts the stop element 18.

In the final opened position, the interior of the valve housing 4 is subdivided by the valve body 10 into an inflow section 22 and an outflow section 24. The inflow section 22 extends from valve inlet 6 to inflection point 12 of the valve body 10. The outflow section 24 extends from the inflection point 12 of the valve body 10 to the valve outlet 8. It is apparent from FIG. 2 that the inflow section 22 has a cross-section, the smallest cross-section of which is greater than the smallest cross-section of the outflow section 24.

Figure 3:
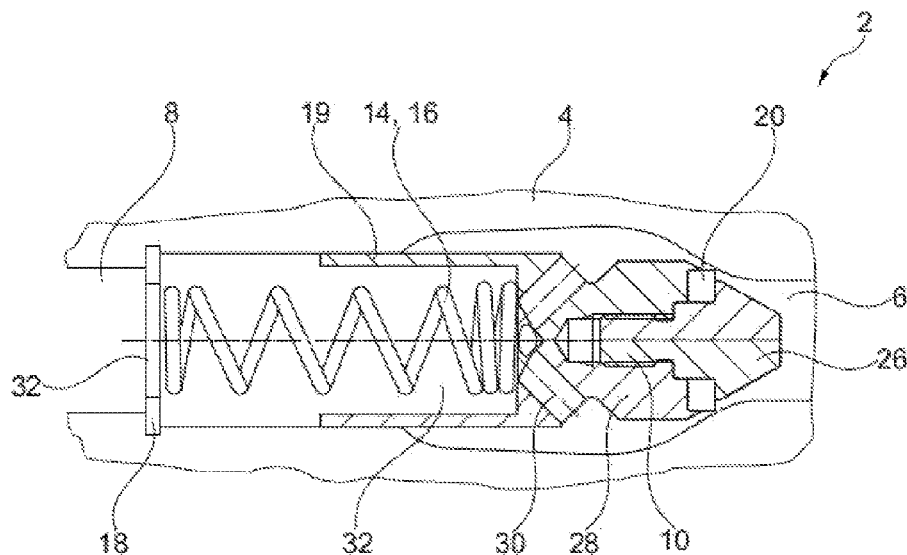
FIG. 3 shows a sectional side view of a second exemplary embodiment of the valve unit with a valve body in the closed position.
Figure 4:
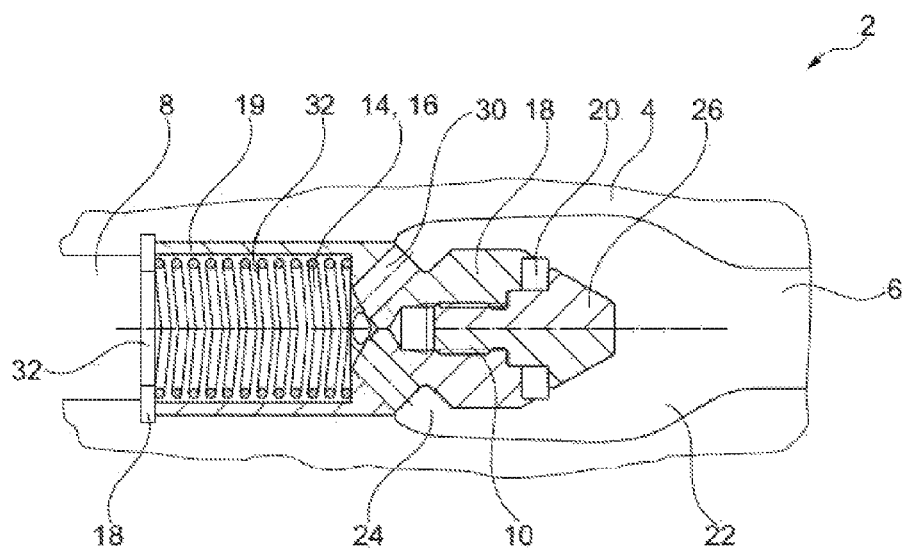
FIG. 4 shows a sectional side view of the second exemplary embodiment according to FIG. 3 with the valve body in the final opened position.

FIG. 3 shows a second exemplary embodiment of valve unit 2. In this valve unit, the valve body 10 has an arrow-shaped body and a multipart design. Thus, the valve body 10 includes a head part 26 and a base part 28, which may be detachably joined to another by means of a screw connection. This makes it possible to fix the sealing element 20 to the valve body 10 by screw-connecting the head part 26 to the base part 28.

Additionally, in the exemplary embodiment depicted in FIGS. 3 and 4, the guide means 19 and the valve body 10 are formed as a single component. To be able to ensure the guiding of fluid past the valve body 10, the valve body 10 of the exemplary embodiment according to FIGS. 3 and 4 includes notches 30 which open into a recess 32 of the stop element 18, and which ensure a flow of fluid from the valve inlet 6 to the valve outlet 8.

The features of the invention shown in the foregoing description, in the claims and in the drawings may be essential, both individually, as well as in any arbitrary combination, to the implementation of the invention and its various embodiments.

The invention claimed is:

1. A valve unit for a motor vehicle comprising at least one valve housing, said valve housing including a valve inlet, a valve outlet and a chamber formed therebetween, and at least one valve body disposed within the chamber in the valve housing and having an inflection point, which when viewed from the valve inlet in the direction of the valve outlet includes a cross-section that increases up to the inflection point and decreases past the inflection point, and which is guided from a closed position in which the valve body seals the valve inlet to a final opened position in which the valve body abuts a stop element fixed in the valve housing, releasing the valve inlet, wherein an inflow section is formed in the chamber between the valve inlet and the inflection point of the valve body and an outflow section is formed in the chamber between the inflection point of the valve body and the valve outlet when the valve body is in the final opened position so that a cross-sectional dimension of the chamber gradually reduces in size from the inflow section past the inflection point to the outflow section to provide a lower flow rate, a lower dynamic pressure and a higher static pressure of a fluid flowing through the valve in the inflow section than the outflow section, where the inflow section includes an expanding cross-section in the area of the valve inlet, which expands in the direction of the valve outlet to a maximum cross-section and, once past the maximum cross-section, narrows continually and transitions seamlessly into the outflow section, and where the maximum cross-section is located upstream of the valve body when in the final opened position.

2. The valve unit according to claim 1, wherein the inflow section and/or the outflow section includes a truncated cone-shaped cross-section in the area of the valve body.

3. The valve unit according to claim 1, having at least one stop element, which is disposable in or disposed in the outflow section, and which is indirectly or directly abutted by the valve body in the final opened position.

4. The valve unit according to claim 3, having at least one guide means, which is fixable on or is fixed on the valve body and/or on the stop element, and which supports the valve body against the stop element in the final opened position.

5. The valve unit according to claim 4, wherein the stop element and/or the guide means includes at least one recess extended in the flow direction, and/or wherein the valve body includes at least one notch, which opens into the recess of the stop element and/or the guide means at least in the final opened position, in order to establish a fluid flow from the inflow section to the outflow section, in the final opened position.

6. The valve unit according to claim 1, having at least one return means, with which the valve body may be tensioned into the closed position.

7. The valve unit according to claim 6, wherein the return means includes a return spring, which is fixable or is fixed, at least in sections, in the recess of the guide means, and which is supported on the one hand against the stop element and on the other hand against the valve body or the valve housing.

8. The valve unit according to claim 3, wherein the valve housing, the inflow section, the outflow section, the stop element and/or the valve body have a rotationally symmetrical design.

9. The valve unit according to claim 1, having at least one sealing element, which in the closed position of the valve body abuts the valve body and the valve inlet.

10. The valve unit according to claim 9, wherein the sealing element is fixable in or is fixed in the valve housing between the valve inlet and the inflow section.

11. The valve unit according to claim 9, wherein the sealing element is fixable on or is fixed on the valve body.

12. The valve unit according to claim 9, wherein the valve body includes at least one head part and one base part, which are detachably fixable to one another, and between which the sealing element is fixable or is fixed by joining the head part and the base part, in particular, forming a tongue and groove.

13. The valve unit according to claim 12, wherein the head part and/or the base part includes an arcuate or n-angled section, and/or the valve body includes a ball or arrow-shaped body.

14. A motor vehicle having at least one valve unit comprising at least one valve housing, said valve housing including a valve inlet, a valve outlet and a chamber formed therebetween, and at least one valve body disposed within the chamber in the valve housing and having an inflection point, which when viewed from the valve inlet in the direction of the valve outlet includes a cross-section that increases up to the inflection point and decreases past the inflection point, and which is guided from a closed position in which the valve body seals the valve inlet to a final opened position in which the valve body abuts a stop element fixed in the valve housing, releasing the valve inlet, wherein an inflow section is formed in the chamber between the valve inlet and the inflection point of the valve body and an outflow section is formed in the chamber between the inflection point of the valve body and the valve outlet when the valve body is in the final opened position so that a cross-sectional dimension of the chamber gradually reduces in size from the inflow section past the inflection point to the outflow section to provide a lower flow rate, a lower dynamic pressure and a higher static pressure of a fluid flowing through the valve in the inflow section than the outflow section, where the inflow section includes an expanding cross-section in the area of the valve inlet, which expands in the direction of the valve outlet to a maximum cross-section and, once past the maximum cross-section, narrows continually and transitions seamlessly into the outflow section, and where the maximum cross-section is located upstream of the valve body when in the final opened position.

15. The motor vehicle according to claim 14, wherein the inflow section includes an expanding cross-section in the area of the valve inlet, which expands in the direction of the valve outlet to a maximum cross-section and, once past the maximum cross-section, narrows continually and transitions seamlessly into the outlet section.

16. The motor vehicle according to claim 14, wherein the inflow section and/or the outflow section includes a truncated cone-shaped cross-section in the area of the valve body.

17. The motor vehicle according to claim 14, having at least one stop element, which is disposable in or disposed in the outflow section, and which is indirectly or directly abutted by the valve body in the final opened position.

18. The motor vehicle according to claim 17, having at least one guide means, which is fixable on or is fixed on the valve body and/or on the stop element, and which supports the valve body against the stop element in the final opened position.

19. The motor vehicle according to claim 18, wherein the stop element and/or the guide means includes at least one recess extended in the flow direction, and/or wherein the valve body includes at least one notch, which opens into the recess of the stop element and/or the guide means at least in the final opened position, in order to establish a fluid flow from the inflow section to the outflow section, in the final opened position.

* * * * *